3,323,254
POLYMER-ASPHALT MULCH FORMULATIONS
Bernard J. Gaj, Fanwood, and Louis W. Blanken, Matawan, N.J., assignors to Esso Research and Engineering Company, a corporation of Delaware
No Drawing. Filed Sept. 16, 1965, Ser. No. 487,918
5 Claims. (Cl. 47—9)

This invention relates to establishing and sustaining agricultural crops in semi-arid areas through the use of an improved petroleum based coating. In particular, this invention concerns petroleum base coatings having improved moisture vapor retention properties which coatings, when applied over seed beds, allow the establishing and sustaining of crops on land which ordinarily receives an insufficient amount of natural rainfall to provide sufficient moisture in the soil for seed germination and which sustains the growth of such crops during the critical seedling stage without irrigation. More particularly, this invention concerns petroleum based coating compositions having improved moisture vapor retention characteristics obtained by the inclusion of critical amounts of a polyisobutylene polymer.

The problem of cultivating crops in semi-arid areas has faced mankind since time immemorial. This problem has become even more critical in recent years due to the great expansion in the population of the world. Now, more than ever, it is necessary to utilize every possible acre to either directly support crops or to support animals from which man may draw his sustenance.

In order to provide the moisture necessary for both seed germination and early plant growth in areas of low rainfall, it has recently been suggested that petroleum based coatings mainly in the form of asphalt emulsions be applied over the seed beds. This suggestion and a description of the technique utilized are contained in U.S. Patent 3,061,974, issued Nov. 6, 1962, to Robert A. Louis and Irving F. Wagner.

The critical features of the coating technique are (1) protection from evaporation losses is provided directly above the seed bed and (2) replenishment of moisture expended in plant growth is allowed when rainfall is available. These requirements are met by employing a film of an asphalt comprising emulsion controlled in width over a moisture containing seed bed while leaving an area between seed rows open to receive normal rainfall. The emulsion is applied after seeding and, preferably, when the moisture content of the seed bed is at or near field capacity. Field capacity is defined as the amount of water held in the soil after excess water has drained away by gravitational force and after the rate of downward movement of water has materially decreased. The asphalt strip covering the seed bed then tends to function in a manner similar to a "one-way valve."

When a rainfall occurs which is sufficient to temporarily saturate the top layer of soil, the lateral movement of moisture is relatively rapid, i.e., at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as non-existent.

During short periods of surface saturation, rainfall on the uncoated areas will move under the coated strips to replenish the moisture of the seed bed. When the saturated condition in the uncoated area ceases to exist, the moisture which has moved beneath the coated strips is trapped and its loss either by lateral movement or surface saturation is greatly retarded. Thus, by this technique the moisture obtained from infrequent and short periods of rainfall can be conserved at the very point where it is needed most so as to afford a luxuriant plant growth where uncoated seed beds are unable to sustain any desirable plant life.

It has now been discovered that the ability of petroleum based coatings to trap soil moisture and prevent its evaporation can be substantially improved by the addition of small critical amounts of a polyisobutylene polymer to the coating composition. In particular, it has been observed that the addition of about 0.1 to 5.0 weight percent, preferably 0.5 to 2.0 weight percent, most preferably about 1.0 weight percent, of a polyisobutylene polymer to an asphalt mulch formulation significantly reduced the moisture loss in test soil compared to similar soil coated with the mulch formulations of the prior art cited above. In this specification, weight percents are based on the total weight of the emulsified product.

The petroleum based coatings suitable for use with this invention are preferably asphalt emulsions which emulsions may be either acidic (cationic) or basic (anionic) although the acidic emulsions are preferred. Both types of emulsions are asphalt-in-water emulsions. Typical specifications for both types are listed in the following table:

TABLE I.—CHARACTERISTICS AND COMPOSITION OF ACIDIC AND BASIC EMULSIONS

| | Basic | Acidic |
|---|---|---|
| Emulsion characteristics: | | |
| Viscosity, Saybolt Furol at 77° F | 20–200 | 20–200 |
| Residue (by distillation) wt. percent | 57–70 | 57–70 |
| Settlement, 5 days, wt. percent | 0–3 | 0–3 |
| Residue characteristics: | | |
| Penetration at 77° F., 100 g., 5 sec | 85–200 | 10–200 |
| Solubility in $CS_2$, percent | 97+ | 97+ |
| Ductility at 70° F., cm | 40+ | 40+ |
| Softening Point, ° F | 100–125 | 100–175 |
| Composition, wt. percent: | | |
| Water | 70–30 | 70–30 |
| Asphalt | 30–70 | 30–70 |
| Emulsifier (Preferably polyamines for acidic emulsions, fatty acids for basic) | 0.1–0.5 | 0.1–0.5 |
| Base (e.g. NaOH) | 0.6–0.8 | |
| Acid (e.g. 36% HCl) | | 0.1–0.5 |
| Polyisobutylene polymer | 0.1–5.0 | 0.1–5.0 |
| Solvent | 0–5.0 | 0–5.0 |

Suitable emulsifying agents for use in preparing these emulsions include the following.

Cationic agents:

(1) Primary, secondary, tertiary, and polyamine salts such as the diamine dichloride

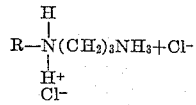

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

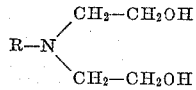

where R is as defined in (1).

(3) Quaternary ammonium salts such as

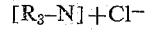

(4) Dimethylated amine salts such as

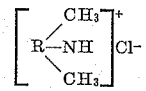

(5) Aromatic amine salts and cyclic amine salts.
(6) 2-imadazoline.
Anionic agents
Alkali agents.
Alkali metal salts of fatty acids such as

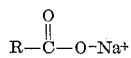

where R is an alkyl chain with 8–22 carbon atoms, preferably 14–18. The potassium salt may also be used. Also, the emulsifying agent is not always one specific compound but could be a mixture of salts of fatty acids in which R varies in length. Examples of these are a sodium salt of pine wood lignin and a salt of a long chain acid resin from the destructive distillation of pine wood stumps; also fine clays such as bentonite can be used.

Whereas the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid ($CH_3COOH$) or nitric acid ($HNO_3$) could be used instead of HCl on a mole per mole basis. Also, KOH could be used instead of NaOH although the latter is cheaper.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties.

The polyisobutylene polymer utilized in the practice of the present invention is preferably a viscous tacky semi-solid having a low molecular weight in the range of about 5,000 to 50,000, preferably about 7,500 to 15,000 and most preferably about 8,700 to 10,000. All molecular weights are Staudinger. A particularly desirable polymer is designated "Vistanex" grade LM–MS, supplied by the Enjay Chemical Company.

The preparation and application of petroleum based coatings to seed beds are extensively described in U.S. Patent 3,061,974, which description is incorporated herein by reference. The desired quantity of the polyisobutylene polymer is generally admixed with the pertoleum product, e.g. asphalt, prior to the emulsification of the petroleum product with water. Small amounts (e.g. 3 wt. percent) of a petroleum distillate solvent (e.g. a cut-back naphtha) may facilitate the preparation of the emulsion. The emulsion compositions of the present invention may be obtained by mixing the ingredients in any manner known to the art, e.g. by stirring, milling, homogenizing, etc.

The advantages obtained by employing polyisobutylene polymers in petroleum based coatings are readily apparent from an examination of comparative experimental results. These results are summarized by the following examples.

*Example 1*

A petroleum based coating composition essentially of the type described by the prior art was prepared by mixing the ingredients set forth in the following formulation.

| | Percent |
|---|---|
| 85–100 Pen Asphalt | 50 |
| Duomeen T ($RNHCH_2 \cdot CH_2NH_2$ where R=tallow) | 0.3 |
| Concentrated HCl | 0.47 |
| Petroleum distillate solvent | 3 |
| Water | 46.23 |

*Example 2*

An emulsion was prepared in the manner of Example 1 with the exception that 1.0 wt. percent of a low molecular weight polyisobutylene polymer ("Vistanex LM–MS," M.W.=8,700–10,000) was included and the water content of the emulsion was reduced to 45.23% to reflect the difference in concentration.

*Example 3*

An emulsion was prepared in the manner of Example 1 with the exception that 1.0 wt. percent of a low molecular polysiobutylene polymer ("Vistanex LM–MS," M.W.=8,700–10,000) and 0.1 of a surfactant (Triton X–45) were utilized and the water content of the emulsion was reduced to 45.13% to reflect the difference in concentration.

*Example 4*

Water retention tests were run on moist soil under controlled conditions. The soil was compacted in 9″ x 9″ soil trays and materials described above in Examples 1 ind 2 were sprayed over the soil at an application rate equivalent to 600 gallons of mulch per acre. The trays were then measured for moisture loss as a function of time. After 24 days, the soil coated with the mulch of Example 2 (containing the polysiobutylene polymer of the present invention) showed 60.7% less loss of moisture than the soil coated with the mulch of Example 1 (containing no polyisobutylene polymer).

*Example 5*

Water retention tests utilizing the mulches of Examples 1 and 3 were run at controlled field conditions in California. The results are shown in Table II.

TABLE II

| Mulch of Example | Application Rate, gallons/acre | Days to Wilt Point* |
|---|---|---|
| 1 | 260 | 8 |
| 1 | 520 | 12 |
| 3 | 260 | 12 |

*The number of days from the time mulch was applied until time when the percent moisture in the soil was insufficient to support growth.

The results in Table II indicate that the mulch of Example 3 has significantly better water retention properties than the mulch of Example 1.

*Example 6*

Water retention tests utilizing the mulches of Examples 1 and 2 were conducted as in Example 5. The results indicated that the mulch of Example 2 could be employed at half the application rate, i.e. 250 gallons/acre, and the water retention properties would be equivalent to those of the mulch of Example 1 when employed at an application rate of 500 gallons/acre.

When utilizing the compositions of the present invention to coat seed beds, it is desired that said coating be limited in width. It is necessary that the width of such coated strips be sufficiently wide to afford protection from surface evaporation from an area directly above and within close proximity of the seed or plant roots. At the same time, to take advantage of subsequent rainfalls the strips must be sufficiently narrow to permit lateral migration of water during short periods of surface saturation to reach all of the area immediately below the coating. This will to some extent be dependent upon the amount of rainfall during the growing season, the frequency of rainfall during the growing season, and the type of soil upon which the application is made. The coating over the seed row should be a continuous film of a thickness and consistency suitable for penetration by young plants or seedlings. The petroleum based coating composition including the polyisobutylene polymer may be applied by any method suitable for leaving a thin continuous film over the seed bed. The preferred method for effecting this application is by spraying, employing either conventional pressure or air atomization techniques.

What is claimed is:
1. A method for increasing crop yields by the improved retardation of moisture loss from seeded areas comprising applying to said seeded areas a film of an asphalt in water emulsion, said film having a thickness and consistency penetrable to young seedlings and being further characterized as containing about 50 weight percent asphalt, 0.3 weight percent of an emulsifier, 0.47 weight percent of conc. HCl, 3.0 weight percent of a petroleum distillate solvent and 1.0 weight percent of a polyisobutylene polymer having a molecular weight of about 8,700 to 10,000.

2. A method for increasing crop yields by the improved retardation of moisture loss from seeded areas comprising applying to said seeded areas a film of petroleum product-in-water emulsion, said film having a thickness and consistency penetrable to young seedlings and being further characterized as containing a minor, moisture retention improving amount of a polyisobutylene polymer.

3. A method as defined by claim 2 wherein said minor moisture retention improving amount is about 0.1 to 5.0 wt. percent.

4. A method as defined by claim wherein said polyisobutylene polymer has a molecular weight of about 5,000 to 50,000.

5. A method as defined by claim 2 wherein said petroleum product is asphalt.

References Cited
UNITED STATES PATENTS

| | | | |
|---|---|---|---|
| 2,408,297 | 9/1946 | Cubberley et al. | 260—28.5 |
| 2,545,963 | 3/1951 | Mack | 260—28.5 |
| 2,599,986 | 6/1952 | Goebel et al. | 260—28.5 |
| 2,690,418 | 9/1954 | Young et al. | 260—28.5 |
| 2,842,507 | 7/1958 | Morris et al. | 260—28.5 |
| 3,050,483 | 8/1962 | Kalil | 260—28.5 |
| 3,061,974 | 11/1962 | Louis et al. | 47—9 |

ABRAHAM G. STONE, *Primary Examiner.*

ROBERT E. BAGWILL, *Examiner.*